United States Patent
Jansson

(10) Patent No.: US 10,974,699 B2
(45) Date of Patent: Apr. 13, 2021

(54) ESTIMATING CONSUMPTION OF WASHER FLUID

(71) Applicant: Volvo Car Corporation, Gothenburg (SE)

(72) Inventor: Claes Jansson, Torslanda (SE)

(73) Assignee: Volvo Car Corporation, Göteborg (SE)

( * ) Notice: Subject to any disclaimer, the term of this patent is extended or adjusted under 35 U.S.C. 154(b) by 163 days.

(21) Appl. No.: 16/181,554

(22) Filed: Nov. 6, 2018

(65) Prior Publication Data

US 2020/0139941 A1    May 7, 2020

(51) Int. Cl.
| | | |
|---|---|---|
| B60S 1/50 | (2006.01) | |
| B60S 5/00 | (2006.01) | |
| G01F 23/00 | (2006.01) | |
| G07C 5/00 | (2006.01) | |

(52) U.S. Cl.
CPC . *B60S 1/50* (2013.01); *B60S 5/00* (2013.01); *G01F 23/0061* (2013.01); *G07C 5/008* (2013.01)

(58) Field of Classification Search
CPC ....................................................... B60S 1/50
See application file for complete search history.

(56) References Cited

U.S. PATENT DOCUMENTS

| | | |
|---|---|---|
| 8,261,613 B2 | 9/2012 | Husain |
| 9,003,878 B2 | 4/2015 | Mawhinney et al. |
| 9,134,162 B2 | 9/2015 | Taylor |
| 2008/0135074 A1 | 6/2008 | Jeon |
| 2017/0305392 A1 | 10/2017 | Lee |
| 2017/0369008 A1 | 12/2017 | Carlesimo et al. |
| 2018/0156654 A1 | 6/2018 | Roux |

(Continued)

FOREIGN PATENT DOCUMENTS

| | | |
|---|---|---|
| DE | 3442610 A1 | 5/1985 |
| DE | 102006030677 A1 | 1/2008 |
| DE | 102008021382 A1 | 11/2009 |

(Continued)

OTHER PUBLICATIONS

Extended Search Report from counterpart European Application No. 1920694.6, dated Mar. 25, 2020, 7 pp.

(Continued)

*Primary Examiner* — Alex C Dunn
(74) *Attorney, Agent, or Firm* — Shumaker & Sieffert, P.A.

(57) ABSTRACT

This disclosure relates to methods and devices for estimating amount of washer fluid to be consumed in a reservoir of a vehicle. In an aspect, a method of a processing device (24, 28) of estimating amount of washer fluid (12) to be consumed in a reservoir (11) of a vehicle (10) is provided. The method comprises estimating (S101) at least one of remaining wash cycles that can be performed and remaining driving distance of the vehicle before the amount of washer fluid (12) has reached a predetermined lower amount of washer fluid (12) based on acquired information indicating current amount of washer fluid (12) remaining in the reservoir (11), temperature that the washer fluid is subjected to, and at least one known washer fluid consumption profile, and generating (S102) data representing said estimated at least one of remaining wash cycles and remaining driving distance.

20 Claims, 7 Drawing Sheets

(56) References Cited

U.S. PATENT DOCUMENTS

2019/0107401 A1* 4/2019 Schmidt .......... G06Q 10/06316

FOREIGN PATENT DOCUMENTS

| | | |
|---|---|---|
| DE | 102015210312 A1 | 12/2016 |
| EP | 1006030 A2 | 6/2000 |
| EP | 1067030 A1 | 1/2001 |
| EP | 3304010 A1 | 4/2018 |
| JP | S6232322 A | 2/1987 |
| JP | S62298724 A | 12/1987 |
| JP | 2009209892 A | 9/2009 |

OTHER PUBLICATIONS

Response to Extended Search Report dated Mar. 25, 2020 from counterpart European Application No. 1920694.6, filed Nov. 9, 2020, 8 pp.

* cited by examiner

ESTIMATING CONSUMPTION OF WASHER FLUID

TECHNICAL FIELD

The disclosure relates to methods and devices for estimating amount of washer fluid to be consumed in a reservoir of a vehicle.

BACKGROUND

In a vehicle such as for instance a car or an autonomous car, a reservoir is generally arranged under a hood of the car for accommodating washer fluid utilized for cleaning for example a windshield, a rear window, a cover glass of a headlight, or a lens of a parking sensor, of a LIDAR sensor, or of a blind spot radar sensor, camera lenses, of the car, etc.

Since the reservoir is arranged under the hood of the car, a driver of the car (or car maintenance personnel) cannot see the reservoir—and thus not the level of washer fluid remaining in the reservoir—without actually opening the hood and performing a close-up inspection of the reservoir. Typically, the driver of the car or the car maintenance personnel will not be made aware of the washer fluid level until the reservoir is empty.

SUMMARY

An object is to solve, or at least mitigate, this problem in the art and thus to provide an improved method of estimating an amount of washer fluid to be consumed in a reservoir of a vehicle.

In an aspect, a washer fluid consumption profile of a driver of a car, and/or a washer fluid consumption profile of the car, is considered upon estimating the amount of washer fluid to be consumed given a current amount remaining in the reservoir. By further taking into account temperature that the washer fluid is subjected to, the consumption being dependent on the temperature, it is advantageously possible to give the driver an estimate of at least one of remaining wash cycles that can be performed and remaining driving distance of the vehicle before the amount of washer fluid has reached a predetermined lower amount of washer fluid.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Techniques of this disclosure are now described, by way of example, with reference to the accompanying drawings, in which.

DETAILED DESCRIPTION

Figure 1:
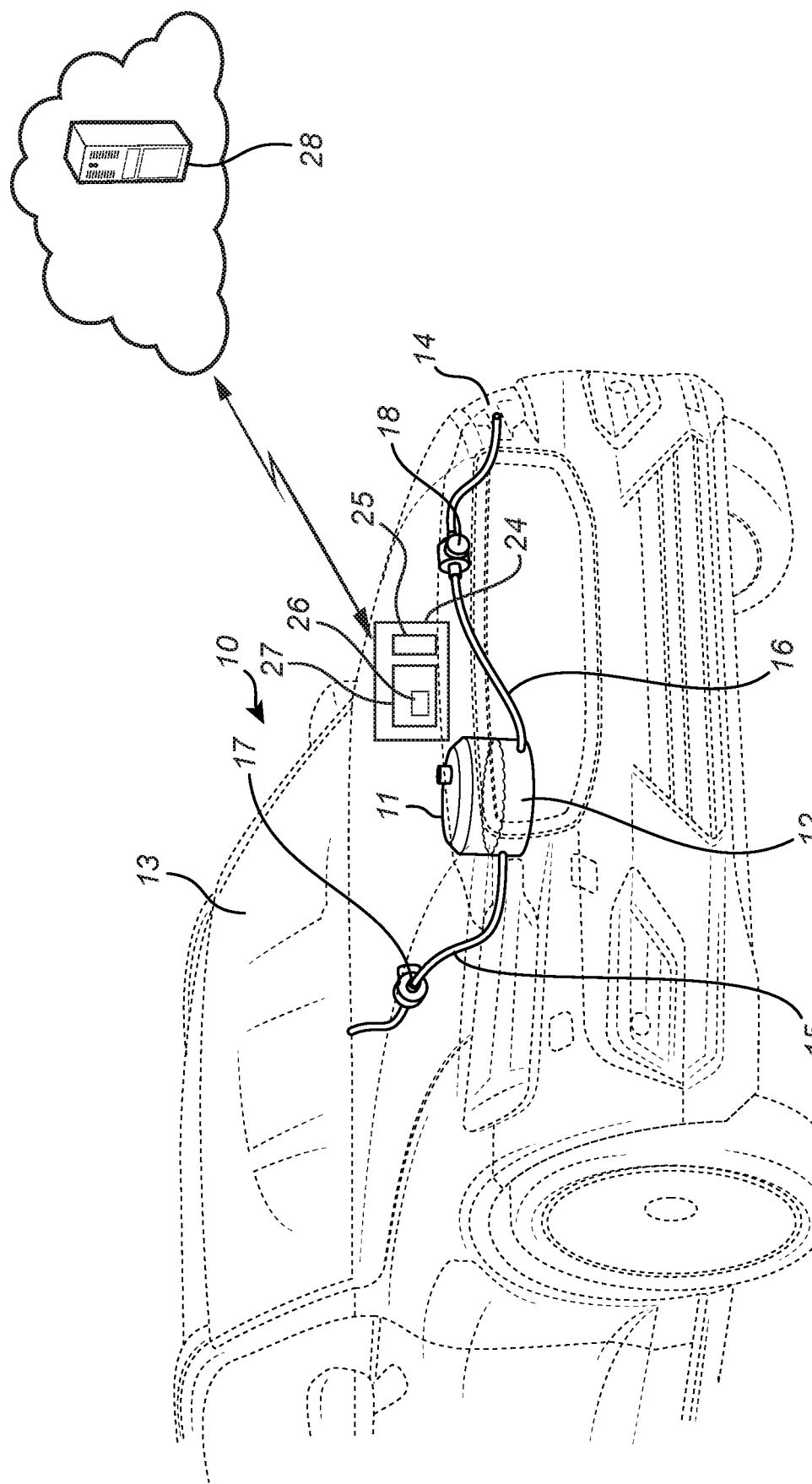
FIG. 1 illustrates a car being equipped with a reservoir accommodating washer fluid, in which car the invention can be applied.

FIG. 1 illustrates a vehicle 10, such as a car (autonomous or non-autonomous), being equipped with a reservoir 11 accommodating washer fluid 12 for cleaning for example a windshield 13 and/or a cover glass 14 of a headlight or the car 10, which may perform the techniques of this disclosure.

One or more channels 15, 16 for transporting the fluid are connected between the reservoir 10 and corresponding one or more pumps 17, 18 being adapted to pump the washer fluid 12 through spray jets (not shown) onto the windshield 13 and headlight cover glass 14 upon a driver of the car 10 operating appropriate cleaning controls inside the car 10. For an autonomous car, it is also necessary automatically to clean e.g. lenses of LIDAR/radar sensors and cameras.

The car 10 is typically equipped with an Electronic Control Unit (ECU, 24), which may be implemented by one or more microprocessors executing appropriate software for controlling various systems and components in the vehicle. The ECU 24 would typically be involved in controlling the pump to draw washer fluid 12 from the reservoir 11 for spraying the washer fluid onto the windshield 13 or cover glass 14 (as well as any cameras or other sensors) via the spray jets. A car may contain a number of interconnected ECUs for controlling all properties of the car such as a brake control module (BCM) or a speed control module (SCM).

Further, the ECU 24 of the car 10 is equipped with a transceiver for wireless communication with for instance a remotely located cloud server 28 or a vehicle fleet management system.

With reference to FIG. 1, the steps of the methods to be described in the following performed by the ECU 24 according to embodiments are in practice performed by a processing unit 25 embodied in the form of one or more microprocessors adapted to execute a computer program 26 downloaded to a suitable storage medium 27.

Processing unit 25 may be implemented as fixed-function processing circuits, programmable processing circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function processing circuits perform are generally immutable. In some examples, the one or more of the units may be distinct circuit blocks (fixed-function or programmable), and in some examples, the one or more units may be integrated circuits.

The processing unit 25 is adapted to cause the ECU 24 to carry out the method according to embodiments when the appropriate computer program 26 comprising computer-executable instructions is downloaded to the storage medium 27 and executed by the processing unit 25. The computer program 26 may be downloaded to the storage medium 27 over a network. Typically, the cloud server 28 is also arranged with a processing unit adapted to execute a computer program downloaded to a suitable storage volatile medium.

In some examples, storage medium 27 may be a temporary memory, meaning that a primary purpose of storage medium 27 is not long-term storage. Storage medium 27 may be configured for short-term storage of information as volatile memory and therefore not retain stored contents if powered off. Examples of volatile memories include random access memories (RAM), dynamic random-access memories (DRAM), static random-access memories (SRAM), and other forms of volatile memories known in the art.

Storage medium 27 may include one or more non-transitory computer-readable storage mediums. Storage medium 27 may be configured to store larger amounts of information than typically stored by volatile memory. Storage medium 27 may further be configured for long-term storage of information as non-volatile memory space and retain information after power on/off cycles. Examples of non-volatile memories include magnetic hard discs, optical discs, flash memories, or forms of electrically programmable memories (EPROM) or electrically erasable and programmable (EEPROM) memories. Storage medium 27 may store program instructions (e.g., computer program 26) and/or information (e.g., data) that, when executed, cause processing unit 25 to perform the techniques of this disclosure.

In a car 10 such as that illustrated in FIG. 1, the reservoir 11 is arranged under a hood of the car 10, where a driver of the car cannot see the reservoir 11 and consequently does not notice when the reservoir 11 is close to being empty.

Techniques of this disclosure may estimate or monitor the amount of washer fluid 12 being accommodated in the reservoir 11. Optionally, the driver of the car is informed of the amount remaining in the reservoir 11, or the amount remaining is communicated to a remote location, such as to a vehicle fleet management system.

A number of parameters affect the volume of washer fluid 12 being discharged from the reservoir 11 upon a user operating the cleaning controls inside the car 10.

One of these parameters is temperature, which affects viscosity of the washer fluid 12 and in general, the higher the temperature, the larger the volume of washer fluid 12 being discharged from the reservoir when the pumps 17, 18 are operated to spray washer fluid 12 onto the windshield 13 or the headlight cover glass 14.

In a first aspect, a washer fluid consumption profile of a driver of the car 10 is considered upon estimating the amount of washer fluid 12 remaining in the reservoir 11, and/or a washer fluid consumption profile of the car 10 itself.

Figure 2A:
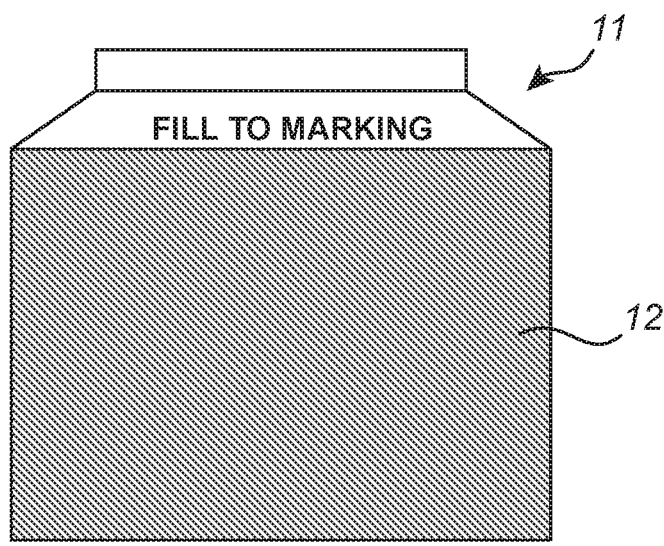
FIG. 2a illustrates a reservoir utilized in an embodiment.

FIG. 2a illustrates a reservoir 11 accommodating a certain amount of washer fluid 12. In this particular example, the reservoir 11 comprises a marking at its top section, and a text instructing the driver to fill the reservoir 11 with washer fluid 12 up to the marking. Thereafter, upon entering the car 10 the driver indicates, for instance in an electronic menu system, that the reservoir 11 has been filled.

Advantageously, with this reservoir, there is no need to equip the reservoir 11 with a level sensor for measuring a reference level of the washer fluid 12 accommodated in the reservoir; the ECU 24 is given an indication that the reservoir is full upon the user providing the information accordingly via the electronic menu system of the car 10.

Figure 2B:
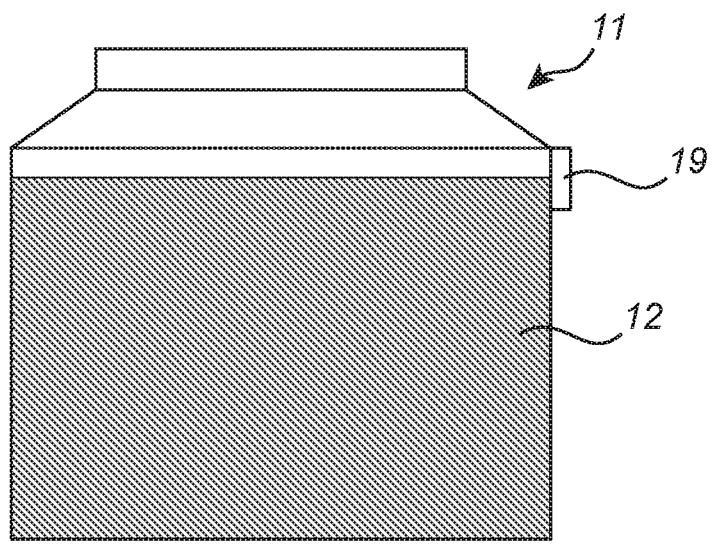
FIG. 2b illustrates a reservoir utilized in another embodiment.

FIG. 2b illustrates another example of a reservoir 11 accommodating a certain amount of washer fluid 12. In this particular embodiment, the reservoir 11 comprises a level sensor 19 for measuring the (reference) fill level of the reservoir 11 and communicating the reference level to the ECU 24.

Advantageously, with this reservoir, the ECU 24 is provided with an exact fill level reference reading, and there is no need for the driver to operate the electronic menu system of the car 10 to indicate to the ECU 24 that the reservoir has been filled.

It is noted that the current washer fluid level may be converted by the ECU 24 into a corresponding volume of the washer fluid 12 being accommodated in the reservoir 11.

Now, in either of the embodiments of FIGS. 2a and 2b, a known washer fluid consumption profile is stored at the ECU 24 to estimate the amount of washer fluid 12 being consumed, and hence a current amount of washer fluid 12 remaining in the reservoir 11.

In an embodiment, the known washer fluid consumption profile represents washer fluid consumption of the vehicle. This is particularly advantageous in case of an autonomous car 10.

In another embodiment, the known washer fluid consumption profile represents washer fluid consumption of a driver of the vehicle.

Figure 3:
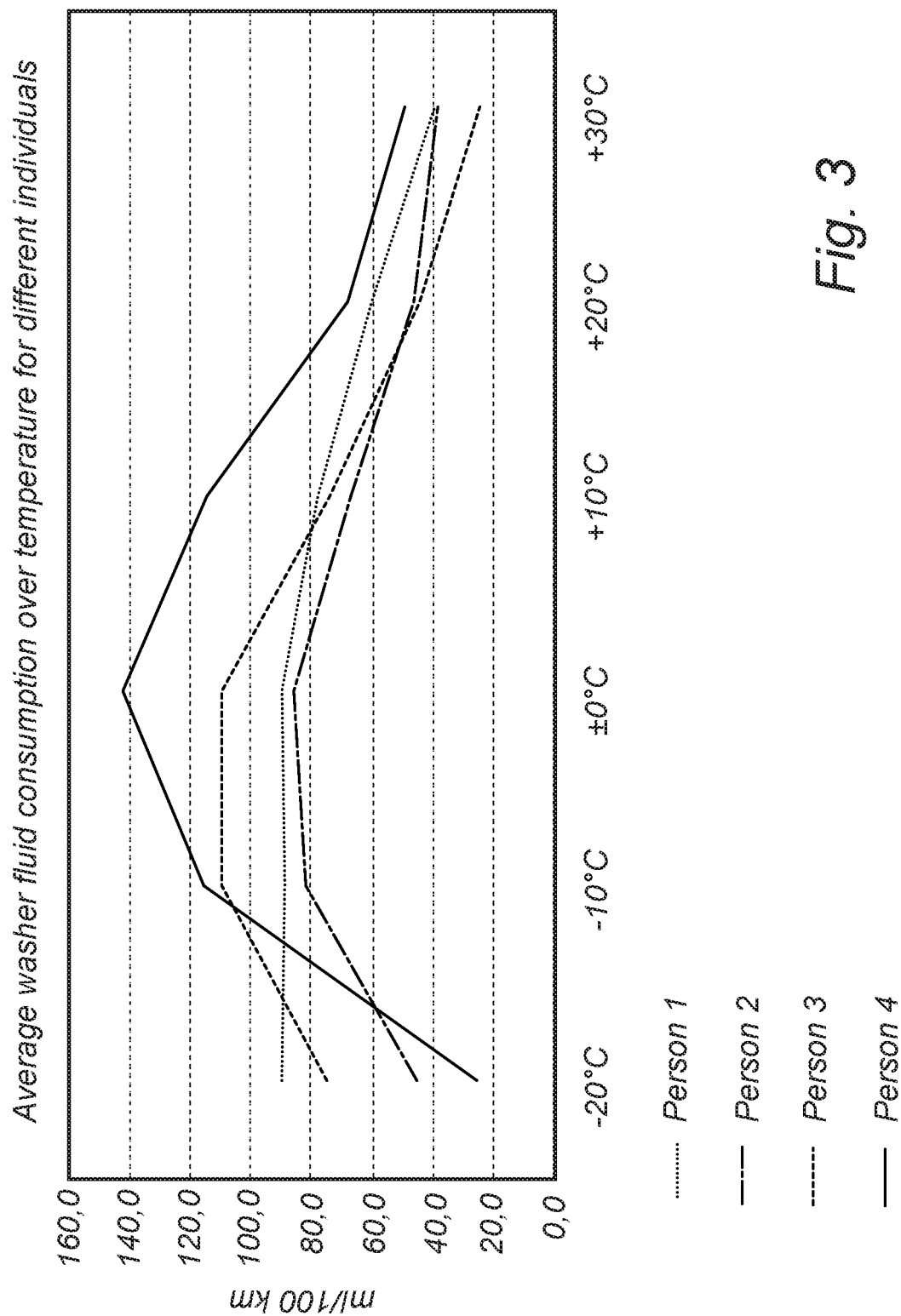
FIG. 3 illustrates washer fluid consumption profiles for four different individuals according to an embodiment.

FIG. 3 illustrates such washer fluid consumption profiles for four different individuals—Person 1, Person 2, Person 3 and Person 4—over a temperature range extending from −20° C. to +30° C.

As is illustrated in FIG. 3, Person 3 consumes in average about 75 ml of washer fluid for every 100 km she has travelled with the car 10 at −20° C., while Person 2 consumes in average about 45 ml of washer fluid for every travelled 100 km at −20° C.

In contrast, at +30° C., Person 3 consumes in average about 24 ml of washer fluid for every travelled 100 km, while Person 2 consumes in average about 38 ml of washer fluid for the same covered distance.

It is noted that the current driver of the car 10 may have to indicate to the ECU 24 via the electronic menu system which one of the driver profiles should be utilized.

Figure 4:
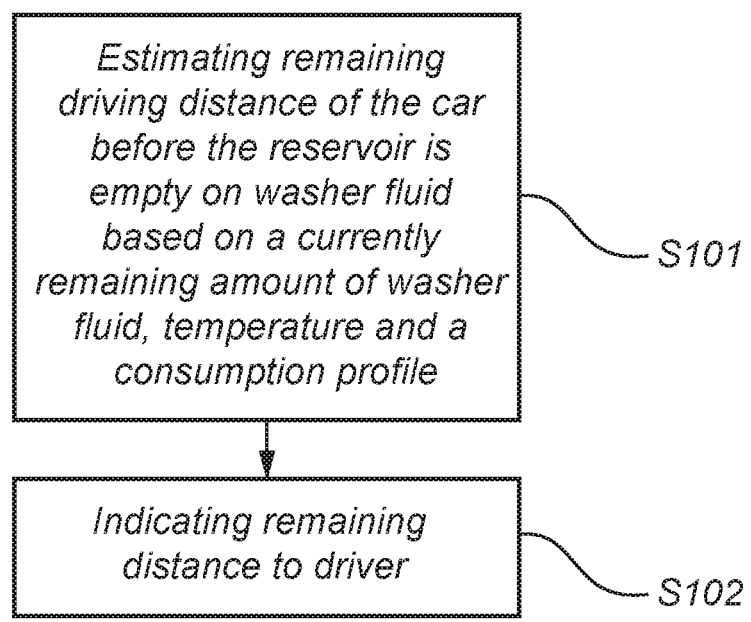
FIG. 4 illustrates a flow chart of a method of monitoring amount of washer fluid accommodated in a reservoir of a vehicle according to an embodiment.

FIG. 4 illustrates a flow chart of a method of estimating amount of washer fluid to be consumed in a reservoir of a vehicle according to an embodiment.

As has been discussed with reference to FIGS. 2a and 2b, the ECU 24 is provided with a reference amount of washer fluid being accommodated in the reservoir 11. Hence, the ECU 24 acquires, either using a currently measured amount or a previously stored amount, information indicating the current amount of washer fluid remaining in the reservoir.

As shown in the example of FIG. 3, in step S101, ECU 24 estimates remaining driving distance of the car before the reservoir is empty on washer fluid based on a currently remaining amount of washer fluid, temperature and consumption profile. Assuming that the remaining volume in the reservoir is 1000 ml, and the ambient temperature is measured to be +30° C., the ECU 24 estimates in step S101 that Person 3 can travel another:

$$\frac{1000}{24} \times 100 = 4166 \text{ km}$$

before the reservoir is empty.

In step S102, data representing the estimated remaining driving distance is generated. For example, in step S2012, ECU 24 indicates the remaining distance to the driver.

This data may in an embodiment be communicated to the driver via e.g. a display unit of the car 10. Alternatively, the ECU 24 further takes into account a current speed of the car 10 and presents to the driver the time remaining before the reservoir 11 is empty based on the current speed, or alternatively a number of washing cycles remaining.

Further, this estimate may continuously be updated by the ECU 24 with changing temperature (and if applicable with changing speed).

Advantageously, when the driver enters the car to go for a drive, the driver is given an estimate of how far he or she can drive before the reservoir 11 is empty on washer fluid 12.

This is particularly advantageous in case the car 10 is autonomous. In such an embodiment, the washer fluid consumption profile of the car 10 is considered. For instance, in the above example (assuming that the consumption profile of the car 10 equals that of Person 3 in FIG. 3), the driver knows that there is a risk that the washer fluid has been fully consumed after about 4160 km, and will be able to take a nap for at least some hours before being alerted by the car 10. Upon being alerted, the driver may for safety reasons need to take over the control of the car 10.

Additionally or alternatively to displaying remaining distance, time or washing cycles to the driver, the ECU 24 may continuously estimate the remaining volume of washer fluid 12 in the reservoir 11. For instance, when the driver has covered a distance of, say, 74 km in the above example, the remaining volume is:

$$1000 - \frac{1000}{24} \times \frac{74}{100} = 969 \text{ ml.}$$

Assuming that the driver finishes her driving after this exemplifying distance has been covered, the ECU 24 may store the estimated remaining washer fluid volume for subsequent use. That stored value may then be used as a reference value (i.e. current amount remaining in the reservoir) for a new estimation.

The next driver using the car may be a different driver (i.e. not Person 3), in which case the estimation will utilize another washer fluid consumption profile and start with the latest estimated remaining volume of 969 ml. Hence, the latest estimated remaining volume of 969 ml of washer fluid 12 in the reservoir 11 is the currently remaining washer fluid amount to be used for estimating a remaining driving distance.

In a further embodiment, not only is the washer fluid consumption profile of the driver (and/or vehicle) taken into account, but further current weather conditions.

As is understood, the washer fluid consumption depends to a high extent on the weather; the consumption is generally lesser at heavy rainfall than at a sunny day with clear skies, where e.g. bugs have a tendency of making for instance the windshield dirty.

Figure 5:
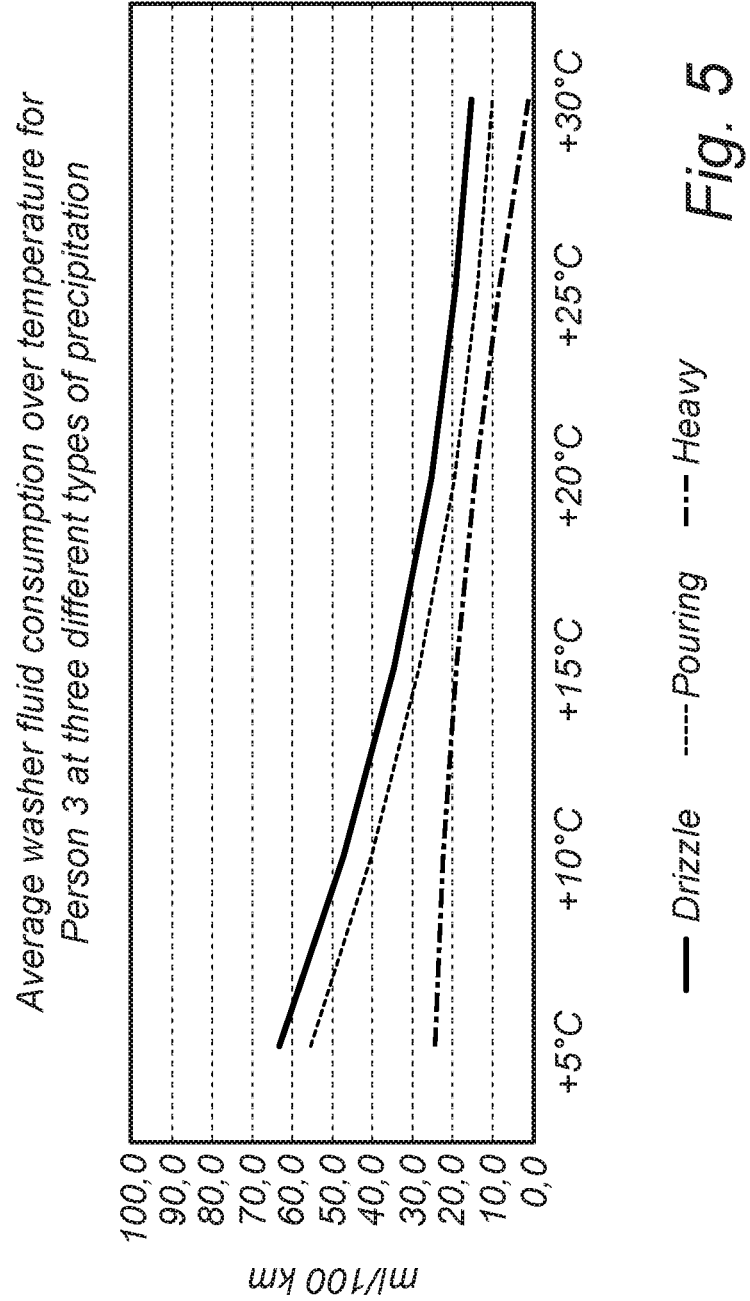
FIG. 5 illustrates Driver 2 washer fluid consumption profiles for one and the same individual over three different types of precipitation according to an embodiment.

FIG. 5 illustrates such driver consumption profiles for one and the same individual, in this example Person 3, at three different types of precipitation over a temperature range extending from +5° C. to +30° C.

In this example, it is assumed that in case of drizzling rain, the washer fluid consumption is about 15 ml for every 100 km at +30° C., 10 ml for every 100 km at +30° C. in pouring rain, and just 1-2 ml for every 100 km in heavy rainfall at +30° C.

Hence, in case the ambient temperature is measured to be +30° C. at drizzling rain, the ECU 24 estimates that Person 3 can travel another:

$$\frac{1000}{15} \times 100 = 6667 \text{ km}$$

before the reservoir is empty.

It is understood that the given numbers are exemplifying only, and may differ greatly between drivers, weather conditions and even individual cars.

As regards the prevailing weather conditions; this may be manually indicated to the ECU 24 by the driver via the electronic menu system, or alternatively by devices such as humidity sensors and cameras being capable of determining the weather conditions and providing information accordingly to the ECU 24.

Further, in addition (or as an alternative) to displaying the estimated remaining driving distance or time to the driver, the estimated distance or time or the estimated remaining volume of washer fluid 12 in the reservoir 11 may be communicated to a computing device locate remotely from the car 10, such as a cloud server or a vehicle fleet management system.

This is particularly advantageous in case the car 10 belongs to a vehicle fleet operator that will manage maintenance of the reservoir and thus know when to fill up the reservoir 11 with washer fluid 12 to prevent a premature empty scenario.

It should be noted that the steps of estimating amount of washer fluid 12 to be consumed in the reservoir 11 of the car 10 performed by the ECU 24 arranged in the car 10 could be performed, additionally or alternatively, by a similar device having processing capabilities located at e.g. the cloud server. It is further envisaged that any data generated as a result of the estimation is communicated from the device to an App on for instance a smart phone of the driver. If so, the vehicle fleet management system may perform the estimation without involving the ECU 24 of the car 10, as long as the device has access to information indicating a current level of washer fluid 12 in the reservoir 11.

In a second aspect, a current amount of washer fluid 12 remaining in the reservoir 11 is determined by taking into account an estimated amount of washer fluid 12 actually having been discharged from the reservoir 11 upon the washer fluid 12 being utilized for cleaning one or more intended parts of the vehicle 10, such as the windshield 13.

In the following exemplifying embodiment, the amount of washer fluid drawn by the pumps 17, 18 is considered upon determining the amount of washer fluid 12 remaining in the reservoir 11.

Assuming again that the reservoir 11 of FIG. 2*a* or 2*b* is utilized, and that the ECU 24 thus is supplied with a reference amount of washer fluid accommodated in the reservoir 11 after the reservoir 11 has been filled with washer fluid 12.

Figure 6:
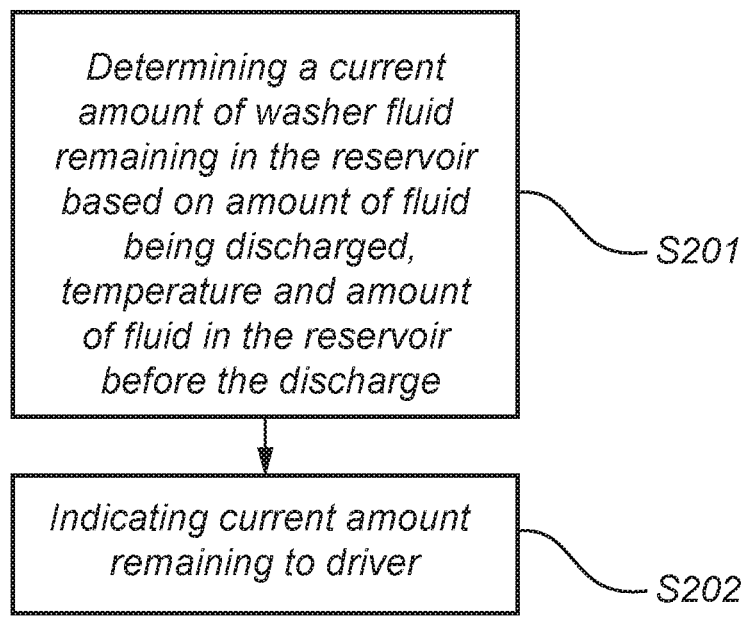
FIG. 6 illustrates a flow chart of a method of monitoring amount of washer fluid accommodated in a reservoir of a vehicle according to an embodiment.

FIG. 6 illustrates a flow chart of a method of determining amount of washer fluid remaining in a reservoir of a vehicle according to an embodiment.

In the example of FIG. 6, in step S201, ECU 24 determines a current amount of washer fluid remaining in the reservoir based on an amount of fluid being discharged, temperature and amount of fluid in the reservoir before discharge. In step S202, ECU 24 indicates a current amount remaining to the driver.

As previously has been described, the ECU 24 is supplied with a reference amount of washer fluid being accommodated in the reservoir.

In this embodiment, the amount of washer fluid 12 being discharged from the reservoir 11 every time the driver operates the cleaning controls inside the car 10 is taken into account. It is noted that the car 10 may perform such actions automatically.

Figure 7:
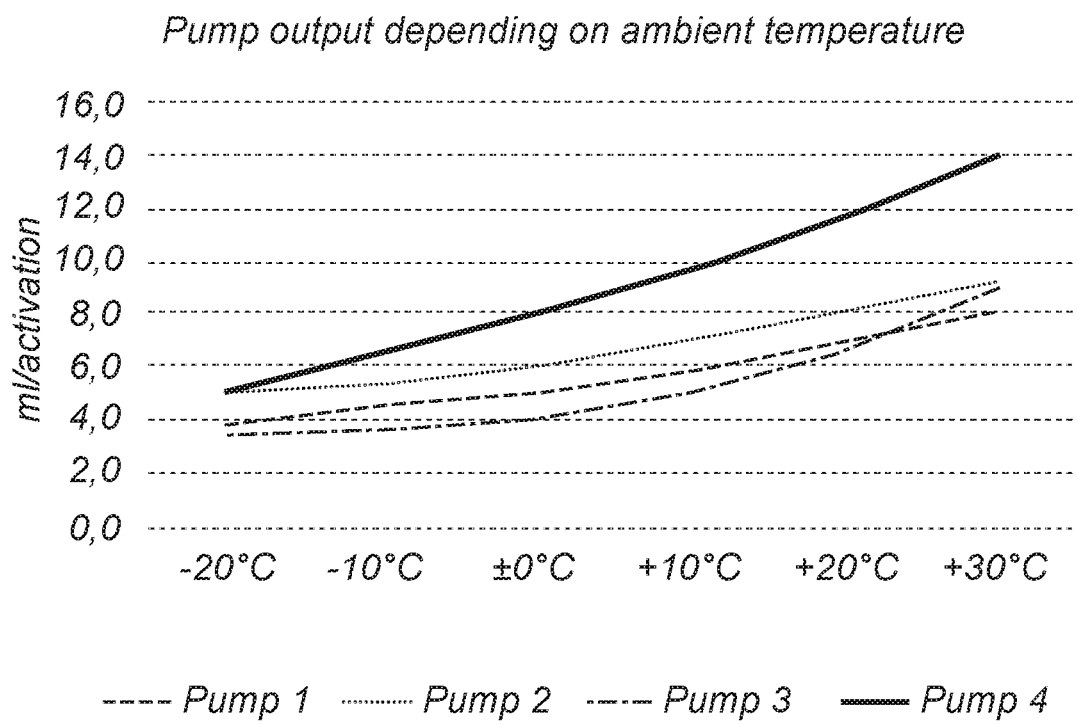
FIG. 7 illustrates washer fluid consumption for individual pumps according to an embodiment.

FIG. 7 illustrates washer fluid consumption for individual pumps via which washer fluid 12 is discharged from the reservoir 11 and sprayed by the previously mentioned spray jets onto for instance the windshield 13 or the headlight cover glass 14.

For instance, Pump 4 corresponds to first pump 17 adapted to spray fluid onto the windshield 13, Pump 3 corresponds to a pump (not shown in FIG. 1) adapted to spray fluid onto a cover glass of radar device of the car 10, Pump 2 corresponds to a pump (not shown in FIG. 1) adapted to spray fluid onto one or more cameras of the (autonomous) car 10, and Pump 1 corresponds to second pump 16 adapted to spray fluid onto the headlight cover glass 14.

In the following example, it is assumed that the ambient temperature is +10° C.

After having ventured on a drive, the driver may for instance one time activate all four pumps by operating the cleaning controls accordingly, which has an effect that Pump 1 causes 5.8 ml of washer fluid 12 to be discharged from the reservoir 11, Pump 2 causes 7.0 ml to be discharged, Pump 3 causes 4.9 ml to be discharged, and Pump 4 causes 9.6 ml to be discharged.

As a result, the volume of the remaining washer fluid 12 in the reservoir 11 is determined in step S201 to be 1000−5.8−7.0−4.9−9.6=972.7 ml. If the driver again operates the four pumps, the remaining washer fluid 12 in the reservoir 11 is determined to be 972.7−5.8—7.0−4.9−9.6=945.4 ml, etc.

Now as previously discussed, this may be displayed to the driver and/or communicated to a remote computing device, such as a vehicle fleet management system for maintenance purposes.

Advantageously, by using an estimate of the amount of fluid being discharged, for instance that illustrated in FIG. 7, complex and expensive level/volume sensors can be avoided, since it is sufficient to have one accurate reference value to start from. It should be noted that the pump consumption values of FIG. 7 can be estimated rather exactly.

As is understood, the remaining amount of washer fluid determined may be used to estimate the remaining driving distance, time or washing cycles by taking into account one or more of the washer fluid consumption profiles previously discussed with reference to FIGS. 3 and 5.

Figure 8:
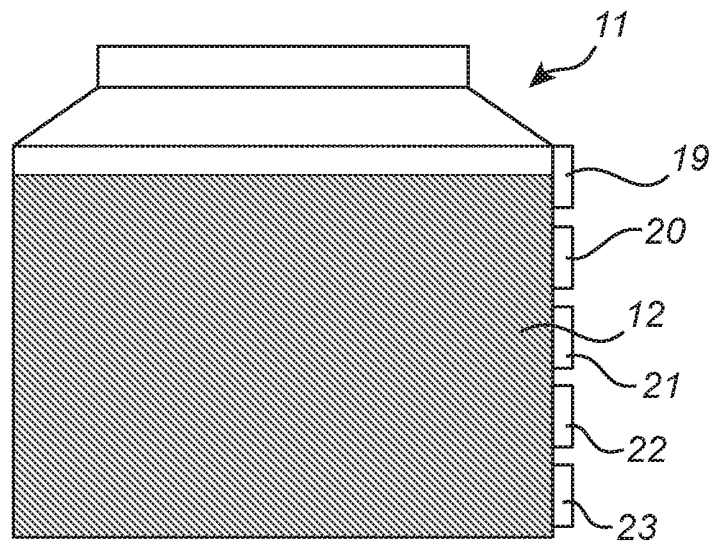
FIG. 8 illustrates a reservoir utilizing a plurality of sensors according to an embodiment.

In a further embodiment, with reference to FIG. 8, a plurality of level sensors 19-23 are utilized to continuously measure the level (and hence volume) of the washer fluid 12 remaining in the reservoir 11. This is applicable to both first and second aspect. In practice, the sensors 19-23 may be implemented by using a sensor array consisting of a series of magnetically activated reed switches and resistors, in combination with a magnetic floater located in the reservoir.

In this further embodiment, similar to the embodiment described with reference to FIGS. 6 and 7, the volume of washer fluid 12 being discharged from the reservoir 11 every time the driver operates the cleaning controls inside the car 10 is taken into account.

Assuming that a first level sensor 19 measures the level of the washer fluid 12 being accommodated in the reservoir 11 and communicates the measurement to the ECU 24, which concludes that the reservoir 11 is full, i.e. that the volume of the washer fluid is 1000 ml.

Again, after venturing on a drive, the driver performs a one-time activation of all four pumps by operating the cleaning controls accordingly (the ambient temperature being +10° C.), which has an effect that Pump 1 causes 5.8 ml of washer fluid 12 to be discharged from the reservoir 11, Pump 2 causes 7.0 ml to be discharged, Pump 3 causes 4.9 ml to be discharged, and Pump 4 causes 9.6 ml to be discharged.

As a result, the volume of the remaining washer fluid 12 in the reservoir 11 is determined to be 1000−5.8−7.0−4.9−9.6=972.7 ml. If the driver again operates the four pumps, the remaining washer fluid 12 in the reservoir 11 is determined to be 972.7−5.8−7.0−4.9−9.6=945.4 ml, and so on.

As previously discussed, this may be displayed to the driver and/or communicated to a remote computing device, such as a vehicle fleet management system or maintenance purposes.

Figure 9:
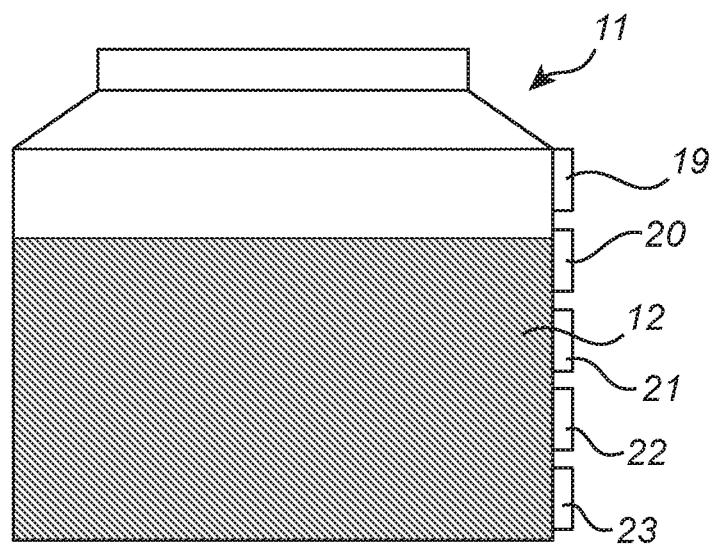
FIG. 9 illustrates a reservoir utilizing a plurality of sensors according to an embodiment, where the level of washer fluid has decreased.

In this embodiment, the determined washer fluid level will be applied until the washer fluid level reaches a second level sensor 20, illustrated in FIG. 9, where the second sensor 20 will measure the actual level of washer fluid 12 in the reservoir 11.

If the determined washer fluid level differs from the actually measured washer fluid level, the measured washer fluid level will be assigned as the current amount of washer fluid 12 remaining in the reservoir 11.

The ECU 24 will thus replace the most recently determined value of the amount of washer fluid remaining with actual value measured by the second sensor 20.

Thereafter, once the driver activates the cleaning controls, the estimated value of the washer fluid 12 discharged from the reservoir 11 will be subtracted from the value measured by the second sensor 20.

This embodiment has as an advantage that a more precise washer fluid volume monitoring method is provided since each sensor 19-23 act as a level calibration point.

With reference to the first aspect, the estimated value of the amount of washer fluid 12 remaining in the reservoir 11 may be repeatedly updated in case a plurality of sensors is used. Hence, each time a new value is measured by a sensor, the subsequent estimation will advantageously start with a calibrated and accurate value.

The ECU 24 will thus replace the most recently estimated volume of the washer fluid with the level (and thus volume) measured by the second sensor 20.

Further, by storing the measured, determined and estimated volumes at the ECU 24 and/or at a remote computing device, it is advantageously possible to perform statistical analyses, such as for instance calculating long or short term average washed fluid consumption for individual drivers or even for a population of drivers taking into account parameters such as temperature and/or weather conditions.

As is readily appreciated by a person skilled in the art, other embodiments than the ones disclosed above are envisaged within the scope of the appended patent claims.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of a processing device of estimating amount of washer fluid to be consumed in a reservoir of a vehicle, comprising:
    estimating, by the processing device, a number of at least one of remaining wash cycles that can be performed and remaining driving distance of the vehicle before the amount of washer fluid has reached a predetermined lower amount of washer fluid based on acquired information indicating a plurality of parameters comprising vehicle driver, current amount of washer fluid remaining in the reservoir and temperature that the washer fluid is subjected to, the acquired information further indicating at least one known washer fluid consumption profile corresponding to statistical analyses for determining, for that vehicle driver, an amount of washer fluid being discharged in each wash cycle given the plurality of parameters; and
    generating, by the processing device and for display on an electronic display device within the vehicle, data representing said estimated number of remaining wash cycles.

2. The method of claim 1, said known washer fluid consumption profile representing washer fluid consumption of a driver of the vehicle.

3. The method of claim 1, said known washer fluid consumption profile representing washer fluid consumption of the vehicle.

4. The method of claim 1, wherein the estimating is based on an estimated amount of washer fluid being consumed derived from said known washer fluid consumption profile, for the temperature that the washer fluid is subjected to.

5. The method of claim 1, wherein the estimating further is based on a current weather condition.

6. The method of claim 5, wherein the estimating is based on an estimated amount of washer fluid being consumed derived from a washer fluid consumption profile indicating washer fluid consumption at different weather conditions.

7. The method of claim 1, further comprising:
    displaying the generated data representing said estimated at least one of remaining wash cycles and remaining driving distance to a driver of the vehicle.

8. The method of claim 1, further comprising:
    communicating the generated data representing said estimated at least one of remaining wash cycles and remaining driving distance to a remotely located computing device.

9. The method of claim 1, wherein the acquiring of information indicating a current amount of washer fluid remaining in the reservoir comprises:
measuring the amount of the washer fluid remaining in the reservoir.

10. The method of claim 1, wherein the acquiring of information indicating a current amount of washer fluid remaining in the reservoir comprises:
acquiring an estimate of the amount of the washer fluid remaining in the reservoir.

11. The method of claim 1, wherein the acquiring of information indicating a current amount of washer fluid remaining in the reservoir comprises:
measuring the amount of the washer fluid remaining at a plurality of levels in the reservoir; and
replacing a recently estimated at least one of remaining wash cycles that can be performed and remaining driving distance of the vehicle before the amount of washer fluid has reached a predetermined lower amount of washer fluid with the measured amount at each of the levels once the washer fluid reaches said each level.

12. The method of claim 1, wherein the at least one known washer fluid consumption profile includes one or more of a washer fluid consumption profile for a driver of the vehicle or a washer fluid consumption profile of an autonomous vehicle.

13. The method of claim 1, further comprising:
determining, using a sensor array of the reservoir, the current amount of washer fluid remaining in the reservoir, wherein the sensor array includes one or more reed switches and one or more resistors.

14. The method of claim 1, further comprising:
responsive to discharging a volume of washer fluid, determining, based on the volume of washer fluid that was discharged, an updated current amount of washer fluid remaining in the reservoir.

15. The method of claim 1, wherein the processing device is included in the vehicle.

16. The method of claim 1, wherein the processing device is included in a cloud server remote from the vehicle.

17. A method of a processing device of determining amount of washer fluid remaining in a reservoir of a vehicle, comprising:

determining, by the processing device, a current amount of washer fluid remaining in the reservoir based on temperature that the washer fluid is subjected to, a vehicle driver, an estimated amount of washer fluid having been discharged from the reservoir upon the washer fluid being utilized for cleaning one or more intended parts of the vehicle, and information indicating amount of washer fluid accommodated in the reservoir before the estimated amount of washer fluid was discharged from the reservoir, wherein the estimated amount of washer fluid is based on at least one known washer fluid consumption profile corresponding to statistical analyses for determining, for that vehicle driver, an amount of washer fluid being discharged each time the vehicle driver operates cleaning controls inside the vehicle; and
generating, by the processing device, data representing the determined current amount of washer fluid remaining in the reservoir.

18. The method of claim 17, wherein the determining of the current amount of washer fluid remaining in the reservoir comprises:
deriving, from a known washer fluid consumption profile of at least one pump via which the washer fluid is discharged from the reservoir for application on the indented parts of the vehicle, the estimated amount of washer fluid being discharged from the reservoir by said at least one pump at the temperature that the washer fluid is subjected to.

19. The method of claim 17, further comprising:
measuring the amount of the washer fluid remaining at a plurality of levels in the reservoir; and
replacing a recently determined current amount of washer fluid remaining in the reservoir with the measured amount at each of the levels once the washer fluid reaches said each level.

20. The method of claim 17, further comprising:
sending the data representing the determined current amount of washer fluid remaining in the reservoir to one or more of a cloud server or a vehicle fleet management system.

* * * * *